Feb. 11, 1941.   H. M. SCHLEGEL   2,231,395
PHOTOGRAPHIC CABINET
Filed June 3, 1939   2 Sheets-Sheet 1
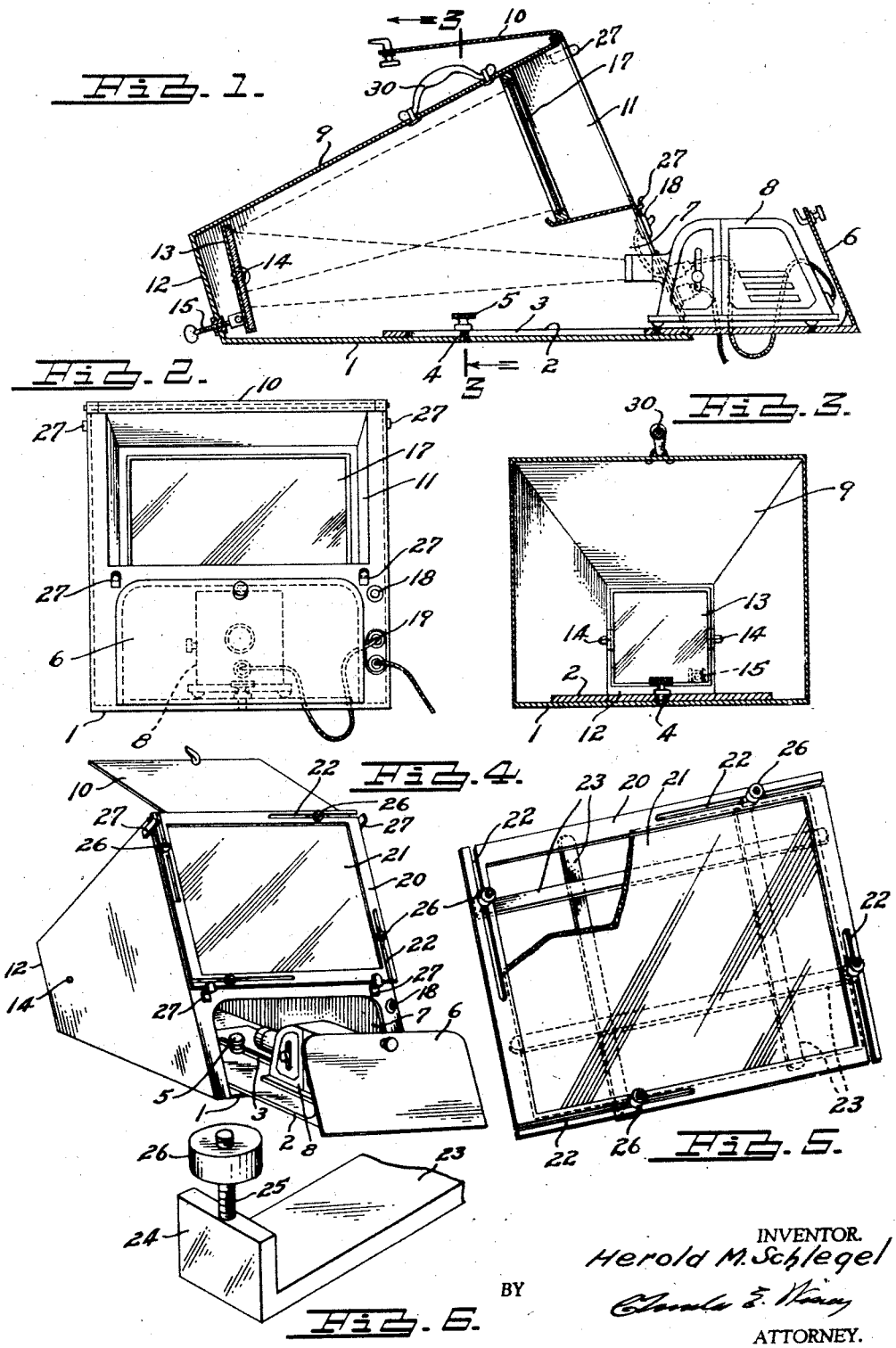
INVENTOR.
Herold M. Schlegel
BY
ATTORNEY.

Feb. 11, 1941. H. M. SCHLEGEL 2,231,395
PHOTOGRAPHIC CABINET
Filed June 3, 1939 2 Sheets-Sheet 2
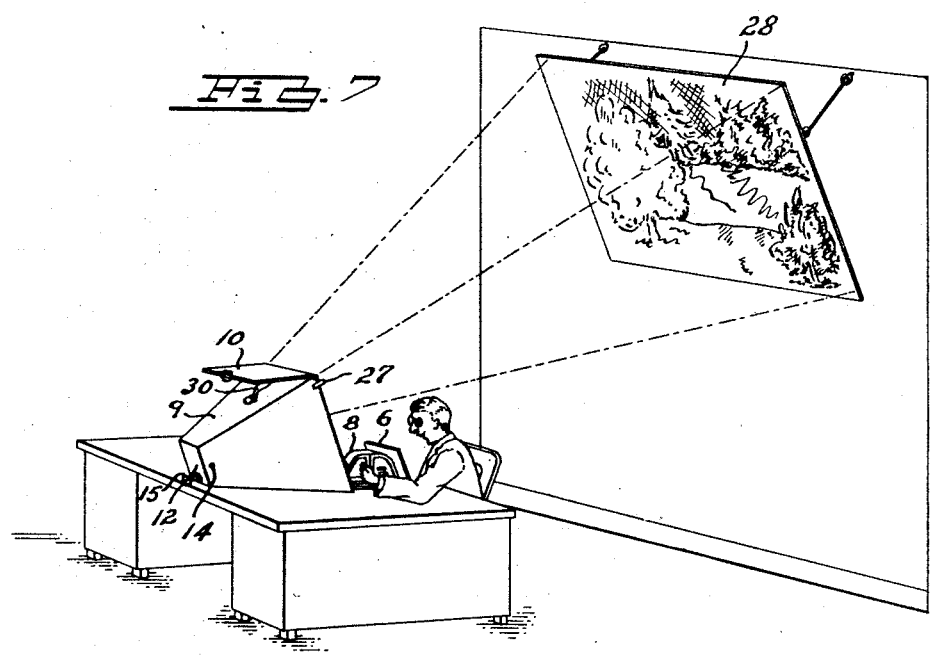
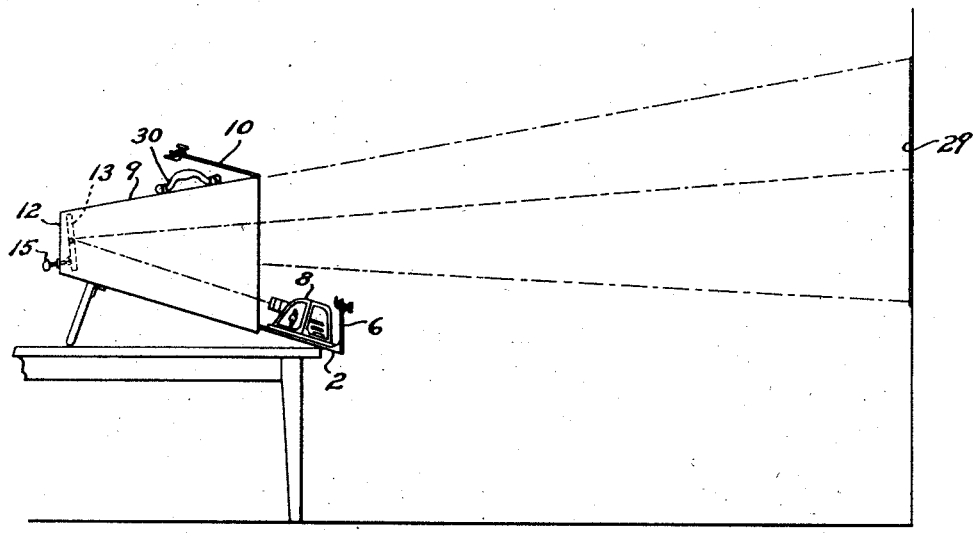
INVENTOR.
Herold M. Schlegel
BY
ATTORNEY.

Patented Feb. 11, 1941

2,231,395

UNITED STATES PATENT OFFICE 2,231,395

PHOTOGRAPHIC CABINET

Herold M. Schlegel, Ann Arbor, Mich., assignor to Volney A. Searles, Ann Arbor, Mich.

Application June 3, 1939, Serial No. 277,297

8 Claims. (Cl. 88—24)

This invention relates to photographic multi-purpose cabinets and the object of the invention is to provide a photographic cabinet for the projection and enlargement of pictures.

One of the particular objects of the invention is to provide a photographic cabinet arranged for use in combination with a projector to project pictures by reflection onto a screen which is positioned in front of the projector operator.

A further object of the invention is to provide a photographic cabinet in which the screen may be removed to allow projection of the picture onto a wall or screen behind the operator so that the operator is facing the audience in operating the projector.

Another object of the invention is to provide a photographic cabinet arranged to be utilized for printing picture enlargements.

A further object of the invention is to provide a photographic cabinet in which a projector may be mounted and having a sliding drawer for the projector arranged so that the drawer may be moved in or out in focusing the projector and in varying the size of the image on the screen or to position with the projector wholly within the cabinet to provide a readily portable unit.

Another object of the invention is to provide a photographic cabinet having a reflecting mirror adjustable to reflect the image from the projector onto the screen and provided with a drawer for the projector movable toward or away from the reflecting mirror to focus and vary the size of the image on the screen.

A further object of the invention is to provide a self-contained unit in a single cabinet provided with a movable projector and having a translucent screen which may be removed for projecting an enlarged image.

These objects and the several novel features of the invention are hereinafter more fully described and claimed and the preferred form of construction by which these objects are attained is shown in the accompanying drawings in which—

Fig. 1 is a section through a photographic cabinet embodying my invention.

Fig. 2 is a front view of the photographic cabinet shown in Fig. 1.

Fig. 3 is a section taken on line 3—3 of Fig. 1.

Fig. 4 is a perspective view of the cabinet provided with a ground glass focusing and enlarging easel mounted over the front thereof.

Fig. 5 is a perspective view of the ground glass focusing and enlarging easel.

Fig. 6 is a view of the end of one of the adjustable framing strips for the focusing and framing easel.

Fig. 7 is a perspective view of the photographic cabinet utilized as a large image screen projector.

Fig. 8 is a view showing the use of the photographic cabinet in printing photo-mural enlargements and projecting onto a vertical screen.

The cabinet shown in Fig. 1 may be formed of wood, metal, pressed paper or plastic construction and comprises a bottom 1 in which a drawer slide 2 is mounted. This slide 2 is provided with a slot 3 shown more particularly in Figs. 3 and 4 and a stud 4 is mounted in the bottom 1 and extends through the slot 3 and is provided with a knurled nut 5 for securing the drawer slide in any desired position.

The end 6 of the drawer slide is arranged to close the opening 7 in the cabinet when the drawer is moved inwardly as will be understood from Figs. 2 and 4. This drawer is arranged to receive either a motion picture projector or a slide projector 8 shown in Fig. 1. The top 9 of the cabinet is provided with a hinged door 10 which may be utilized to close the opening 11 in the cabinet when the cabinet is not in use or being carried. The small end 12 of the cabinet is provided with a mirror 13 pivotally mounted on pivots 14 in the side walls of the cabinet and this mirror may be adjusted on its pivot by means of the screw 15 shown in Fig. 1. At the bottom of the opening 11 a translucent screen 17 is mounted and as indicated in dotted lines in Fig. 1, the image from the projector is directed against the mirror 13 and is reflected from the mirror 13 to the translucent screen 17. This screen may be of ground glass, vellum paper or cellulose screen material so that the image thrown onto the screen appears on the front of the screen directly in front of the projector operator as will be understood from Figs. 1 and 2. When used with a slide projector, the operator may operate the slides in the projector so that the images will appear on the screen 17 either in color or in black and white depending upon the type of slide used.

The cabinet as shown in Figs. 1 and 2 may be provided with an electric throw or push button switch 18 and with a plug-in fixture for plugging the projector into an electric circuit and connecting the receptacle to an electric current supply and preferably arranged so that the switch 18 will control the current supply to the projector which may be either of the motion picture or slide type.

For printing enlargements, the screen 17 may be removed from the cabinet and a ground glass focusing and framing easel may be placed over the cabinet opening 11 as shown in Fig. 4. This focusing and framing easel comprises a rectangular frame 20 having a ground glass pane 21 mounted therein. The frame 20 is provided with a series of slots 22 in the edges and the adjustable framing strips 23 are each provided with an upturned end 24 as shown in Fig. 6 having an extending stud 25 arranged to be inserted through one of the slots 22 and provided with a knurled nut 26 thereon for tightening the framed strips. These framing strips are made of spring metal arranged to firmly engage the inner side of the glass panel 21. In use, this framing easel is positioned within the clips 27 on the front end of the cabinet and the picture to be printed is projected by means of the projector onto the ground glass 21. By adjusting the framing strips in position the portion of the picture desired to be printed may be framed by these framing strips. By moving the drawer and projector inwardly or outwardly, larger or smaller prints may be made by varying the size of the image in this manner and the critical focusing may be accomplished by adjustment of the projector lens. When properly focused, the easel may be tipped outwardly to allow the insertion of photographic printing paper between the framing strips and the ground glass, at which time, by turning the easel back to the position shown in Fig. 4 and closing the switch 18 for the desired printing exposure time the picture may be printed on the photographic paper.

By removing the focusing and framing easel from the cabinet opening 11 the picture may be projected onto a flat or tilted screen 28 shown in Fig. 7. This will operate effectively irrespective of whether the projector is a slide or motion picture projector. In this connection it will be noted that the operator faces the audience so that he may readily explain the pictures to the audience as they are projected instead of turning his back to the audience as is the case with the usual projector.

Fig. 8 illustrates another use of the cabinet in which the cabinet or screen is tilted to throw the image onto a large sheet 29 of photographic paper for printing enlarged photographic murals. Of course, this must be used in a darkened room in order to avoid fogging the paper with light other than that projected from the projector but may thus be used to provide extremely large prints and photographic murals. By sliding the projector drawer inwardly as will be understood from Figs. 1 and 2 the projector is enclosed within the photographic cabinet and by closing the door 10 over the projection opening. the entire cabinet with the projector may be carried by means of the handle 30 shown in Figs. 1 and 3.

From the foregoing description it becomes evident that the device is very simple and efficient in operation, provides a compact photographic cabinet containing the projector and arranged to project or print pictures as desired and provides a device which accomplishes the objects described.

Having thus fully described my invention, its utility and mode of operation, what I claim and desire to secure by Letters Patent of the United States is:

1. In a photographic cabinet, a casing, a drawer slidably mounted in the casing and arranged to receive a projector thereon, a mirror pivotally mounted in one end of the casing, a translucent screen in the casing over the projector drawer, the projector being arranged to project an image onto the mirror, means for adjusting the mirror on its pivot to reflect the image onto the screen so that the image is visible to the operator, means for adjusting the drawer longitudinally of the casing to vary the size of the image onto the screen, a cover arranged to close the screen opening and the drawer being provided with an end arranged to close the drawer opening as the drawer is moved into the casing, and a handle secured to the top of the casing for carrying the same.

2. In a photographic cabinet, a casing, a drawer slidably mounted in the casing and arranged to receive a projector thereon, a mirror pivotally mounted in one end of the casing on a horizontal pivot, a translucent screen supported at an opening in the casing above the projector drawer, the projector being arranged to project an image onto the mirror and adjustable in respect thereto by means of the drawer for focusing or to a position wholly within the casing, means for adjusting the mirror on its pivot to reflect the image onto the screen so that the image is visible to the operator, the screen being removable to allow the reflected image to be projected through the screen opening to the exterior of the casing.

3. In a photographic cabinet, a casing having an upper and a lower opening, a drawer slidably mounted in the lower opening of the casing and arranged to receive a projector thereon, a mirror pivotally mounted in the end of the casing opposite said openings, a translucent screen in the upper opening of the casing above the projector drawer, the arrangement being such that an image from the projector may be thrown onto the mirror, means for adjusting the mirror to reflect the image onto the screen, and means for adjusting the drawer longitudinally of the casing to enlarge or reduce the image on the screen or to position with the drawer closed to enclose the projector within the casing.

4. In a photographic cabinet, a casing, a drawer slidably mounted in the casing and arranged to receive a projector thereon, a mirror pivotally mounted in one end of the casing on a horizontal pivot, a translucent screen in the casing over the projector drawer, the projector being arranged to project an image onto the mirror and housed within the casing when the drawer is closed, means for adjusting the mirror on its pivot to reflect the image onto the screen so that the image is visable to the operator, the screen being removable, a translucent focusing and framing easel arranged to be mounted on the casing over the opening left by the removed screen, and means for securing a sensitized photographic paper on the easel on the side toward the mirror.

5. In a photographic cabinet, a casing, a support slidably mounted in the casing and arranged to receive a projector thereon, a mirror pivotally mounted in the end of the casing opposite the projector, means for adjusting the mirror on its pivot, a translucent screen mounted in the end of the casing opposite the mirror adjacent the projector support, the casing being shaped so that an image from the projector may be reflected by the mirror onto the screen to be visible to the operator, said slidable support providing a means for adjusting the projector in respect to the mirror in the image projecting relation and to position the projector within the casing for transportation as a unit.

6. In a photographic cabinet, a casing having a base, a support slidably mounted on the base, a projector mounted on the support, an opening in the front of the casing through which the projector may be moved by movement of the slide into and out of the casing, said support having a portion extending upwardly from the base at the rear of the projector and closing the said opening when the slide is moved with the projector thereon into the casing, a mirror in the end of the casing opposite the said opening, a translucent screen in the casing above the said projector opening onto which the image from the projector is reflected by the mirror and visible from the projector end of the casing.

7. In a photographic cabinet, a casing including a base and a front wall inclined to the vertical, said wall having an opening above the base, a support slidable on the base, a projector carried by the support and movable into and out of the casing through said opening by movement of the support, said support having a portion closing the said opening when the projector is moved into the casing, a mirror at the opposite end of the casing from that occupied by the projector, and a translucent screen adjacent the front inclined wall of the casing and above the projector, said front wall of the casing having a second opening through which the screen is visible, and a cover member for the said last named opening, the arrangement providing that an image projected on the mirror by the projector is reflected on the screen and visible through the said second opening.

8. In a photographic cabinet, a casing, a projector supported at one end thereof, a mirror onto which an image is projected by the projector, a removable translucent screen onto which the image is reflected by the mirror, said mirror being angularly adjustable relative to the axis of the projector lens, the projector being adjustable in a plane parallel with the base toward or from the mirror for focusing or to a position wholly within the casing for manual transportation, framing strips associated with the screen for supporting a sensitized photographic paper on the side of the screen facing the mirror, and a controllable electric circuit for timing the exposure of the photographic paper.

HEROLD M. SCHLEGEL.